United States Patent [19]

Kitamura et al.

[11] Patent Number: 5,418,894
[45] Date of Patent: May 23, 1995

[54] COLORING OF DESIGNATED IMAGE AREA AND PINHOLE ELIMINATION BY IMAGE SCALING

[75] Inventors: Hideaki Kitamura; Masayuki Sasahara, both of Kyoto, Japan

[73] Assignee: Dainippon Screen Mfg. Co., Ltd., Kyoto, Japan

[21] Appl. No.: 850,451

[22] Filed: Mar. 10, 1992

[30] Foreign Application Priority Data

Mar. 12, 1991 [JP] Japan ................. 3-73933

[51] Int. Cl.$^6$ .......................... G06T 5/50
[52] U.S. Cl. ................... 395/131; 395/139; 358/452
[58] Field of Search ........... 395/131, 139; 355/328; 358/452, 453, 518; 382/47

[56] References Cited

U.S. PATENT DOCUMENTS

| | | | |
|---|---|---|---|
| 4,514,767 | 4/1985 | Kubata et al. | 358/465 |
| 4,847,689 | 7/1989 | Yamamoto et al. | 358/534 |
| 4,872,064 | 10/1989 | Tutt et al. | 382/47 |
| 4,958,301 | 9/1990 | Kobayashi | 395/131 |
| 5,068,909 | 11/1991 | Rutherford et al. | 382/54 |
| 5,086,346 | 2/1992 | Fujiwara | 382/47 |
| 5,086,487 | 2/1992 | Katayama et al. | 382/56 |
| 5,113,455 | 5/1992 | Scott | 382/47 |
| 5,130,791 | 7/1992 | Abe | 358/452 |
| 5,130,935 | 7/1992 | Takiguchi | 358/518 X |
| 5,148,294 | 9/1992 | Kurogane et al. | 358/452 |
| 5,153,936 | 10/1992 | Morris et al. | 382/47 X |
| 5,175,815 | 12/1992 | Wada | 395/162 |
| 5,247,372 | 9/1993 | Tsutamori et al. | 358/452 |
| 5,264,942 | 11/1993 | Shimotsuji et al. | 358/261.1 |
| 5,289,570 | 2/1994 | Suzuki | 358/452 X |
| 5,311,334 | 5/1994 | Sugiura | 358/518 X |

*Primary Examiner*—Heather R. Herndon
*Assistant Examiner*—Anton Fetting
*Attorney, Agent, or Firm*—Ostrolenk, Faber, Gerb & Soffen

[57] ABSTRACT

An original image which is painted with at least first and second colors is subjected to a coloring process wherein a pixel block of M×N pixels in an original image is replaced by a representative pixel to generate a low density image. Then a subject image area is specified in the low density image, and the subject image area is painted with a desired color. The low density image is then magnified to form a high density image, and the high density image and the original image are compared with each other whereby another image is composed from the two images. Black image areas in the composed image area are finally changed to white. In the composed image, the desired color is allocated to pixels which have the desired color in the high density image and which are black in the original image while "white" is allocated to the other pixels. Pin holes, which are not specified as subject image areas, are not filed with the desired color, and are eliminated simultaneously when the subject image area is filled with the desired color.

8 Claims, 12 Drawing Sheets

SCT

|      | Ns | Nd |
|------|----|----|
| R1a: | 1  | 0  |
| R2a: | 2  | 1  |
| R3a: | 3  | 1  |

SCT

|      | Ns | Nd |
|------|----|----|
| R1a: | 1  | 0  |
| R2a: | 2  | 5  |
| R3a: | 3  | 1  |

Fig. 15

|   |   |   |   |   |   |   | Rb |   |
|---|---|---|---|---|---|---|---|---|
| 1 | 1 | 1 | 1 | 1 | 1 | 1 | 1 | 1 |
| 2 | 1 | 1 | 1 | 1 | 1 | 1 | 1 | 1 |
| 2 | 2 | 1 | 1 | 1 | 1 | 1 | 1 | 1 |
| 3 | 2 | 2 | 2 | 2 | 1 | 1 | 1 | 1 |
| 3 | 3 | 2 | 2 | 2 | 2 | 1 | 1 | 1 |
| 3 | 3 | 2 | 2 | 2 | 2 | 2 | 1 | 1 |
| 3 | 4 | 2 | 6 | 6 | 2 | 2 | 2 | 1 |
| 4 | 4 | 2 | 6 | 6 | 6 | 2 | 2 | 2 |
| 5 | 5 | 5 | 5 | 5 | 5 | 5 | 2 | 2 |

|   |   |   |   |   |   |   | Rb |   |
|---|---|---|---|---|---|---|---|---|
| 1 | 1 | 1 | 1 | 1 | 1 | 1 | 1 | 1 |
| 2 | 1 | 1 | 1 | 1 | 1 | 1 | 1 | 1 |
| 2 | 2 | 1 | 1 | 1 | 1 | 1 | 1 | 1 |
| 3 | 2 | 2 | 2 | 2 | 1 | 1 | 1 | 1 |
| 3 | 3 | 2 | 2 | 2 | 2 | 1 | 1 | 1 |
| 3 | 3 | 2 | 2 | 2 | 2 | 2 | 1 | 1 |
| 3 | 2 | 2 | 5 | 5 | 2 | 2 | 2 | 1 |
| 2 | 2 | 2 | 5 | 5 | 5 | 2 | 2 | 2 |
| 5 | 5 | 5 | 5 | 5 | 5 | 5 | 2 | 2 |

IST

| $Ns(2) = Ns(4)$ |
|---|
| $Ns(5) = Ns(6)$ |

COLORING OF DESIGNATED IMAGE AREA AND PINHOLE ELIMINATION BY IMAGE SCALING

BACKGROUND OF THE INVENTION

1. Field of the Invention

The present invention relates to a method of and an apparatus for filling an image area in a block copy image (an image including characters, illustrations, logos, figures on a base sheet) with a desired color by processing image data representing the block copy image.

2. Description of the Related Art

A block copy, that is, an original including characters and linework to be reproduced, is first prepared in prepress process of a plate for color printing or monochromatic printing. The block copy includes phototype-setting characters and drafted keylines arranged in the same dimensions and quality as final prints, and also has directions for the subsequent reproduction process.

Typical procedure in a prepress process includes: tint laying for uniformly filling a specified area in an image with a desirable color; and coloring characters in the image with a predetermined color. The term 'coloring' in this specification implies various coloring processes including tint laying.

Some modern image processing systems have an ability to perform automatic coloring, comprising: an image scanner for reading binary image data of a block copy image; and an image processor for filling a certain closed area or connected area in the block copy image with a desired color on the basis of the binary image data. Conventional image processors perform the coloring processing based on relatively low-resolution image data, which is obtained by scanning an image at a resolution of approximately 400 scanning lines per inch.

Recent technological innovation has allowed the image processing system to process a large volume of image data at a relatively high speed. Accordingly, there has been a strong desire in the field of prepress and printing for an improved system which is able to perform automatic coloring at a high speed on a large volume of image data having a high resolution of approximately 2,000 scanning lines per inch.

The high resolution scanning, however, often causes a large number of pin holes in a binary image. Pin holes are small black dots in a white area of the binary image or small white dots in a black area. The pin holes act as noise components deteriorating the image quality. Since the pin holes are hard to remove after the coloring process, they are required to be eliminated before the coloring process to improve the image quality.

Conventionally, the pin holes are manually eliminated one by one; an operator thoroughly checks an image displayed on a CRT (cathode ray tube) for pin holes and fills each pin hole with the color of an area surrounding the pin hole. This manual processing consumes rather a long time especially when an image includes a large number of pin holes.

Furthermore, since coloring and elimination of pin holes are executed as separate processes, the whole of the image processing requires a considerably long time.

SUMMARY OF THE INVENTION

An object of the present invention is accordingly to provide an improved method and an apparatus therefor for coloring an image area and for eliminating a pin hole.

The present invention is directed to a method of coloring an original image which is painted with at least first and second base colors by processing image data representing the original image, comprising the steps of:

(a) substituting a representative pixel for a block of M by N pixels in the original image, where M and N are integers, to thereby produce a reduced image;

(b) selecting a subject color from the first and second base colors, specifying a subject image area having the subject color in the reduced image, and assigning a desired color to the subject image area;

(c) filling the subject image area with the desired color to produce a reduced color image;

(d) replacing each pixel in the reduced color image by a block of M by N pixels all painted with the same color as the corresponding pixel in the reduced color image to produce a magnified color image; and (e) allocating the desired color to pixels which are painted with the subject color in the original image and which are filled with the desired color in the magnified color image, and allocating a non-subject color to the other pixels in the magnified color image, the non-subject color being one of the first and second base colors other than the subject color.

In the preferred embodiment, the step (b) comprises the step of specifying an image area other than a prospective pin hole area as the subject image area.

According to an aspect of the present invention, the first and second base colors are black and white; and the step (a) comprises the step of allocating the subject color to the representative pixel for the pixel block which has at least one pixel of the subject color, and allocating the non-subject color to the representative pixel for the pixel block which has no pixels of the subject color.

According to another aspect of the present invention, the first and second base colors are black and white; and the step (a) comprises the step of reducing the original image by skipping pixels to thereby produce the reduced image.

In the preferred embodiment, the step (e) comprises the step of allocating a desired color number indicating the desired color to the pixels which have a subject color number indicating the subject color in the original image and which have the desired color number in the magnified color image, and allocating a non-subject color number indicating the non-subject color to the other pixels in the magnified color image.

Preferably, the step (b) comprises the steps of specifying a line segment and identifying the subject image area which has the subject color and on which the line segment is crossing.

Alternatively, the step (b) comprises the steps of specifying a plane figure and identifying the subject image area which has the subject color and at least part of which is included in the plane figure.

The present invention is also directed to an apparatus for coloring an original image which is painted with at least first and second base colors by processing image data representing the original image, comprising:

image reduction means for substituting a representative pixel for a block of M by N pixels in the original image, where M and N are integers, to thereby produce a reduced image;

input means for selecting a subject color from the first and second base colors, specifying a subject image area having the subject color in the reduced image, and assigning a desired color to the subject image area;

filling means for filling the subject image area with the desired color to produce a reduced color image;

image magnification means for replacing each pixel in the reduced color image by a block of M by N pixels all painted with the same color as the corresponding pixel in the reduced color image to produce a magnified color image; and color changing means for allocating the desired color to pixels which are painted with the subject color in the original image and which are filled with the desired color in the magnified color image, and allocating a non-subject color to the other pixels in the magnified color image, the non-subject color being one of the first and second base colors other than the subject color.

The present invention is further directed to an apparatus for coloring an original image which is painted with at least first and second base colors by processing original image data representing the original image, comprising:

a first image memory for storing the original image data;

display means for displaying images;

input means for selecting a subject color from the first and second base colors, specifying a subject image area having the subject color in the reduced image displayed on the display means, and assigning a desired color to the subject image area;

computation means for substituting a representative pixel for a block of M by N pixels in the original image, where M and N are integers, to produce a reduced image; filling the subject image area with the desired color to produce a reduced color image; replacing each pixel in the reduced color image by a block of M by N pixels all painted with the same color as the corresponding pixel in the reduced color image to produce a magnified color image; allocating the desired color to pixels which are painted with the subject color in the original image and which are filled with the desired color in the magnified color image, and allocating a non-subject color to the other pixels in the magnified color image, the non-subject color being one of the first and second base colors other than the subject color, to thereby produce modified color image data representing a modified color image; and a second image memory for storing the modified color image data.

In the preferred embodiment, the apparatus further comprises: means for preparing the original image data in the form of run-length data; means for restoring run-length data to bit map data; and wherein the computation means comprises means for producing the modified color image data in the form of run-length data.

Preferably, the apparatus further comprises: means for recording the modified color image data on a photo-sensitive recording medium; and wherein the means for preparing the original image data comprises means for reading the original image to produce original bit map data, and converting the original bit map data into run-length data.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 13 through 16 are explanatory views showing processing of the region segmentation;

FIG. 17 is an explanatory view illustrating structure of an identical system color table;

DESCRIPTION OF TEE PREFERRED EMBODIMENT

A. Structure of Apparatus

Figure 1:
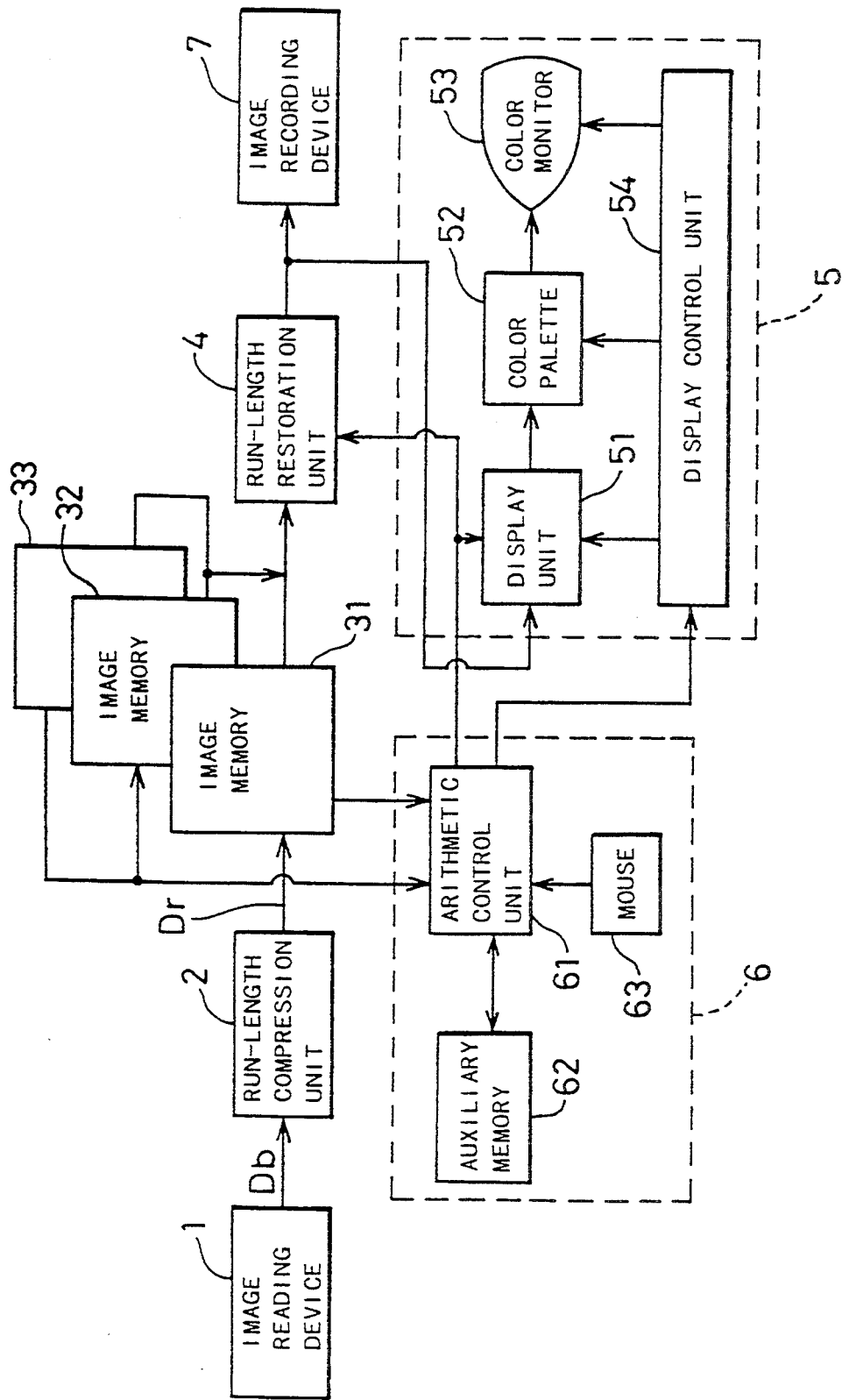
FIG. 1 is a block diagram showing basic structure of an image processor for coloring an image, embodying the invention.

FIG. 1 is a block diagram of an image processor for coloring an image area embodying the invention. The image processor includes the following parts:

(a) Image reading device 1: reading a block copy image to obtain binary image data. The image reading device is a flat-bed type scanner.

(b) Run-length data compression unit 2: compressing the binary image data read by the image reading device 1 to produce run-length data.

(c) Image memories 31, 32 and 33: storing run-length data of a block copy image supplied from the run-length data compression unit 2 or a main processor unit 6 described later. The first image memory 31 stores run-length data of an original block copy image and a final colored block copy image. The second and the third image memories 32 and 33 store image data representing an image temporarily generated in coloring process.

(d) Run-length data restoration unit 4: restoring run-length data supplied from the image memories 31 through 33 to produce bit map data.

(e) Color monitor device 5: displaying a color image as a function of the bit map data supplied from the run-length data restoration unit 4 or the main processor unit. The color monitor device 5 includes:

(e-1) a display memory 51 for storing bit map data of an image to be displayed;

(e-2) a color palette 52 for converting color numbers (described later) included in image data supplied from the display memory 51 into brightness signals of R for red, G for green, and B for blue according to color information, where the color information indicates the correspondence between each color number and the color signals of three primary colors;

(e-3) a color monitor 53 for displaying a color image; and (e-4) a display control 54 for controlling the display of an image on the color monitor 53, renewing the color information stored in the color palette 52, and adjusting the position of a displayed cursor on the color monitor 53 according to the movement of a mouse 63.

(f) Main processor unit 6: controlling the whole image processor and executes required operations. The main processor unit 6 includes:

(f-1) a central processing unit 61, or arithmetic and control unit, for controlling each part of the image processor and executing various operations including image area segmentation and coloring;

(f-2) an auxiliary memory 62 for storing temporary data required in the course of processing; and (f-3) a mouse 63 for specifying a target area to be processed in an image displayed on the color monitor 53 and selecting a desired color, in the coloring process.

(g) Image recording device 7: recording a colored image onto a recording medium such as a photosensitive film.

B. Process Executed in a First Embodiment

Figure 2:
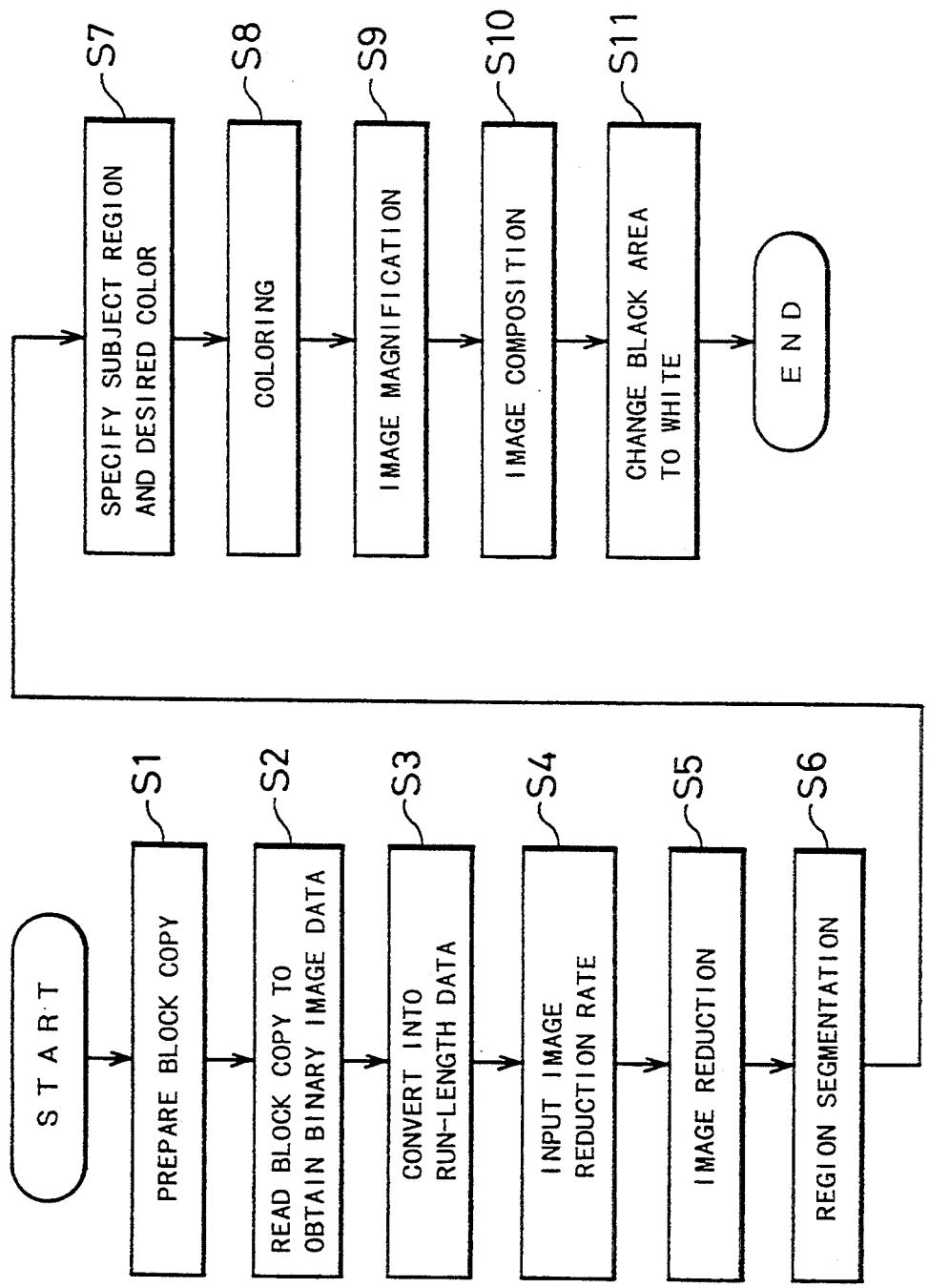
FIG. 2 is a flowchart showing the coloring process.

FIG. 2 is a flowchart showing procedure of the first embodiment.

Figure 3:
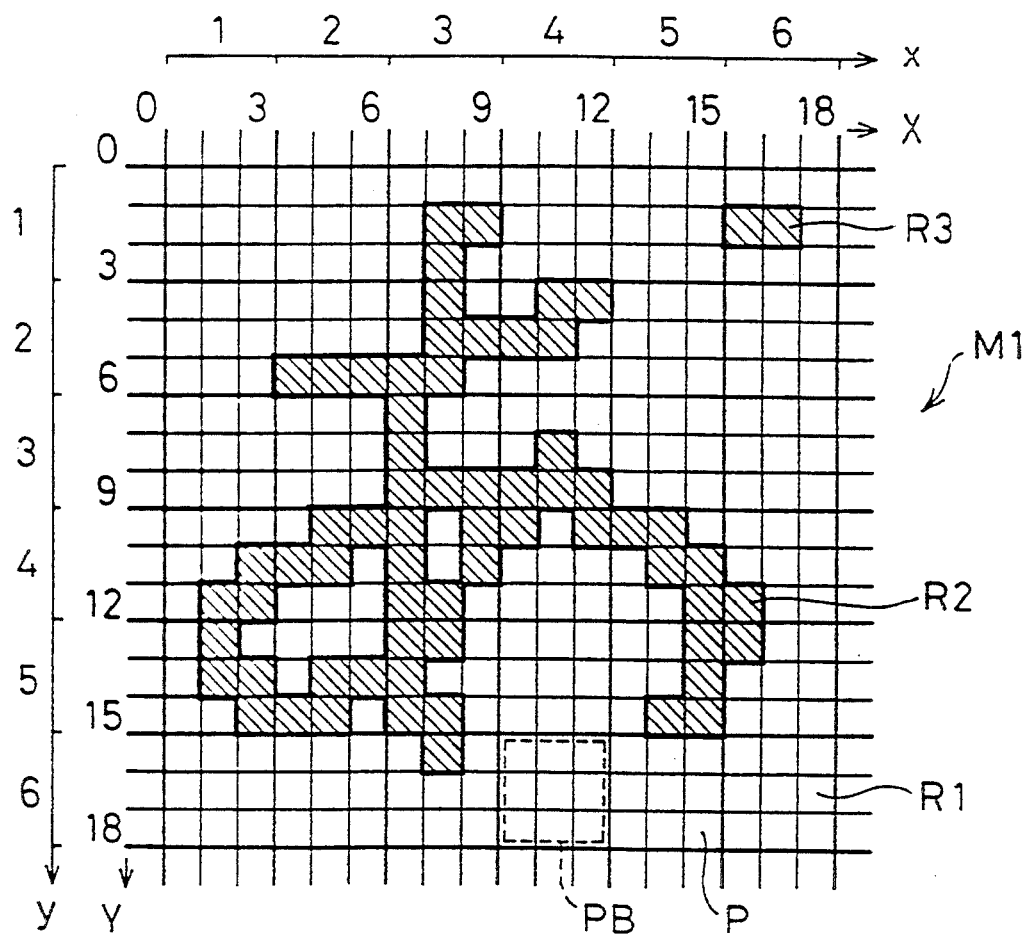
FIG. 3 is a plan view illustrating an original image to be processed in the embodiment of FIG. 1.

After a block copy with characters and figures disposed on a base sheet is prepared at step S1, binary image data Db of the block copy is read by the image reading device 1 at step S2. FIG. 3 is a plan view showing a part of a binary image of the block copy at step S2. The block copy image M1 includes a white background image area R1, a black character image area R2, and a black pin hole area R3. The pin hole area R3 consists of two pixels.

Figure 4:
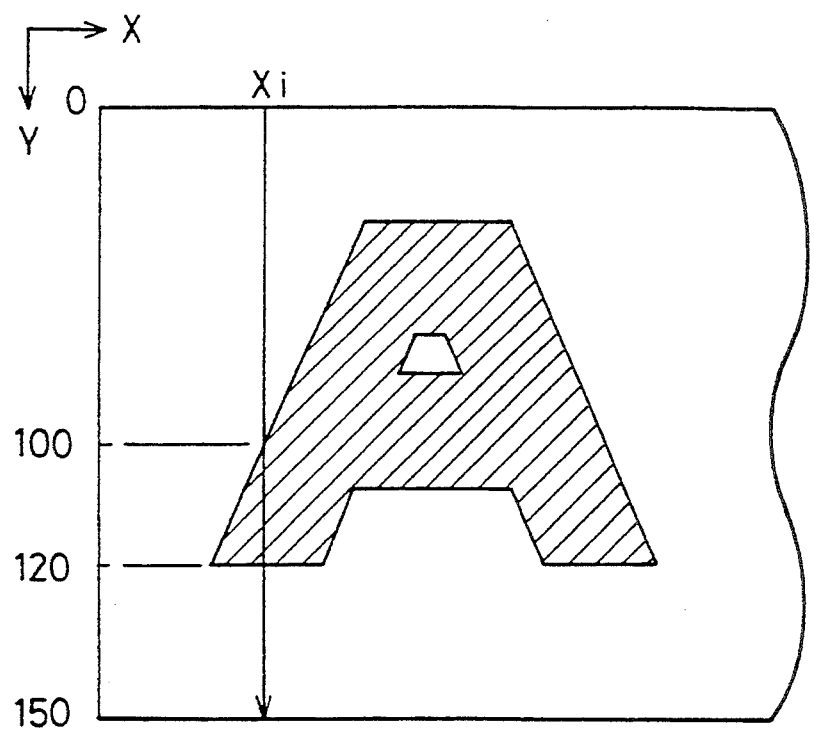
FIG. 4 is an explanatory view showing a scanning line in an image.
Figure 5:
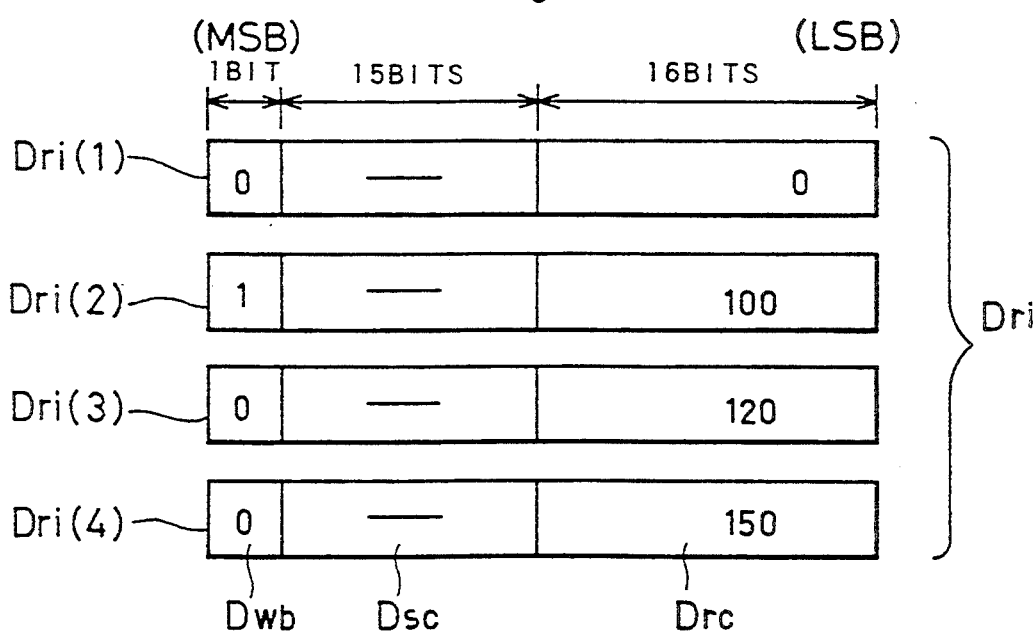
FIG. 5 is also an explanatory view showing another structure of the run-length data Dr.

The program then proceeds to step S3, at which the binary image data Db is transmitted from the image reading device 1 to the Run-length data compression unit 2 and converted into run-length data Dr. FIGS. 4 and 5 are explanatory views illustrating a typical example of the run-length data Dr.

An image of letter 'A' is shown in FIG. 4 with a main scanning direction Y on the vertical axis and subscanning direction X on the horizontal axis. The value in the main scanning direction Y on the block copy ranges from zero to a hundred and fifty.

FIG. 5 shows the structure of run-length data Dri at a subscanning coordinate Xi. The run-length data Dri includes four consecutive data Dri(1) through Dri(4), each of which will be hereinafter referred to as "unit run-length data". Each unit run-length data Dri(1), Dri(2), Dri(3), or Dri(4) represents one black or white "run" and consists of thirty two bits: the most significant bit is a white/black designation data Dwb indicating whether the run is black or white; the next fifteen bits are system color data Dsc representing a system color number (described later); and the lower sixteen bits are coordinate data Drc indicating the coordinate value of the starting point of the run in the main scanning direction.

At the subscanning coordinate Xi, as seen in FIG. 4, the first run is white from 0 to 99 of the main scanning coordinate, the second run is black from 100 to 119, and the third run is white from 120 to 150. Each of the three unit run-length data Dri(1) through Dri(3) indicates a coordinate value of the starting point of each run, and whether the run is black or white. The last unit run-length data Dri(4) shows the maximum value ($=150$) in the main scanning direction, which indicates the end of the main scanning line. The system color data Dsc in the run-length data does not have any significant meaning at this stage since the system color has not yet been determined.

The run-length data Dr thus obtained is supplied from the Run-length data compression unit 2 to the first image memory 31 and stored therein. The image M1 of FIG. 3 is displayed on the color monitor 53 in black and white on the basis of the run-length data Dr.

At step S4, an operator determines a rate of density reduction. Here, the density reduction denotes processing to substitute one pixel for a pixel block including several pixels. The pixel skipping well-known in the art is a kind of the density reduction. In this embodiment, one pixel is substituted for a square block of $N \times N$ pixels according to a special density reduction process described later in detail. The rate of density reduction is expressed as $1/N$, and is set to be equal to $\frac{1}{3}$ in the embodiment.

At step S5, the arithmetic and control unit 61 executes the special density reduction on the block copy image with the predetermined density reduction rate. The block copy image M1 of FIG. 3 is divided into pixel blocks PB each consisting of $N \times N$ pixels (in the embodiment, N is equal to 3). If at least one black pixel exists among nine pixels P in each pixel block PB, a low density pixel representing the pixel block PB is a black one. On the other hand, the low density pixel is white if the pixel block does not include any black pixels. The low density pixels constitute a low density image, or a reduced image. The low density pixels correspond to "the representative pixels" in the present invention; "the first base color" is black; and "the second base color" is white.

Figures 6, 7:
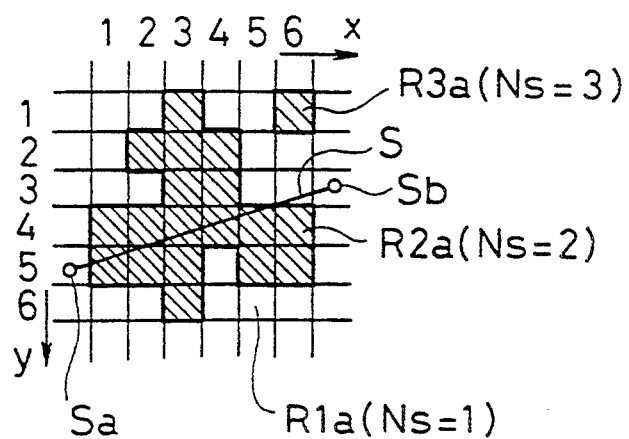
FIG. 6 is a plan view illustrating a low density image, or a reduced image, processed in the embodiment of FIG. 1.
FIG. 7 is an explanatory view showing an example of a system color table.

FIG. 6 is a view showing a low density image obtained by executing the special density reduction on the block copy image M1 of FIG. 3 with the density reduction rate of one third. Coordinates (x, y) in lower case letters shown in FIG. 3 are scanning coordinates of the low density image in FIG. 6. The low density image of FIG. 6 includes image areas R1a through R3a corresponding to the image areas R1 through R3 of FIG. 3. This low density image is displayed on the color monitor 53, and its image data is transmitted to the second image memory 32 to be stored therein.

At step S6, the arithmetic and control unit 61 performs region segmentation processing on the low density image. In the region segmentation, the whole low density image is divided into separate areas each separated by a boundary between a black portion and a white portion, and a system color number Ns is allocated to each separate area. In the example of FIG. 6, the image is divided into three separate areas, that is, the background image area R1a, the character image area R2a, and the pin hole area R3a. Since the low density image has only one ninth the number of pixels (generally $1/(N\times N)$) in the original image, the density reduction shortens the processing time of the region segmentation.

The system color numbers Ns of one through three are allocated to the three separate areas R1a through R3a, respectively. Each system color number Ns is registered as the system color data Dsc of each unit run-length data Dri shown in FIG. 5.

The arithmetic and control unit 61 produces a system 5 color table SCT representing the correspondence between the system color numbers Ns and the display colors (in this embodiment, the display colors are black and white), and stores the table SCT in the auxiliary memory 62. FIG. 7 shows an example of the system color table SCT. The table SCT includes the system color numbers Ns and display color numbers Nd. Here, the display color number Nd=0 denotes white, and Nd=1 black.

The number allocated to each separate image area is called the system color number Ns because it is automatically given by the arithmetic and control unit 61 and it is usable to indicate the color of the area. The region segmentation processing will be described later in detail.

Incidentally, the operator may specify a region-to-be-processed in the region segmentation process in the block copy image displayed on the color monitor 53. Specifying only a part of the block copy image as a subject area will considerably decrease the processing time for the region segmentation.

The program then proceeds to step S7 at which the operator specifies a subject image area, or an image area-to-be-processed in coloring process, and assigns to the subject image area a desired color with which the subject image area is to be filled. In order to specify the subject area, the operator sets a line segment S crossing the subject image area R2a in the block copy image displayed on the color monitor 53 as shown in FIG. 6, and specifies the color of the subject image area R2a, which is black in FIG. 6. The segment S is set, for example, by clicking the button on the mouse 63 at points Sa and Sb, respectively. The color of the subject image area is specified by selecting the color out of the menu of colors displayed on the color monitor 53. The subject image area is thus specified.

The operator then assigns a desired color to fill the subject image area, for example, by selecting a color (for example, red) with the mouse 63 out of several prospective colors displayed on the color monitor 53.

Figures 8, 9:
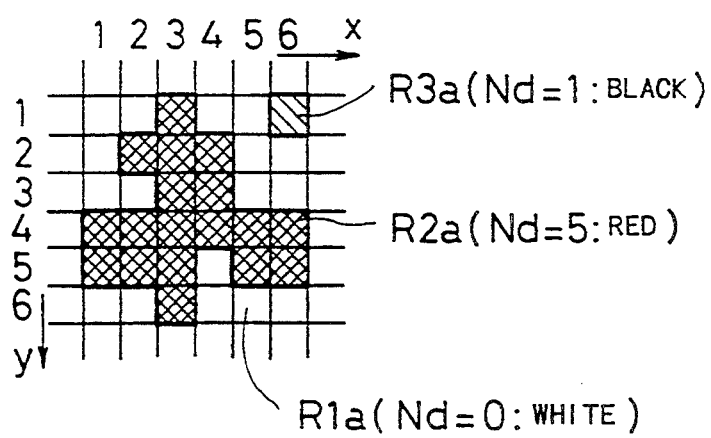
FIG. 8 is a plan view illustrating a low density image processed in the embodiment of FIG. 1.
FIG. 9 is an explanatory view showing another example of the system color table.

At step S8, the arithmetic and control unit 61 identifies the subject image area which crosses the segment S and which has the subject color, black; the image area R2a is thus identified as the subject image area in this embodiment. The subject image area R2a is then painted with the desired color, red. FIG. 8 is a view showing a colored image, in which the color of the image area R2a is changed to red. The display color number Nd of the image area R2a is changed to five, accordingly. This coloring process is executed, as shown in FIG. 9, by changing the display color number Nd for the image area R2 a to the numeral five representing the desired color (red) in the system color table SCT.

Figure 10:
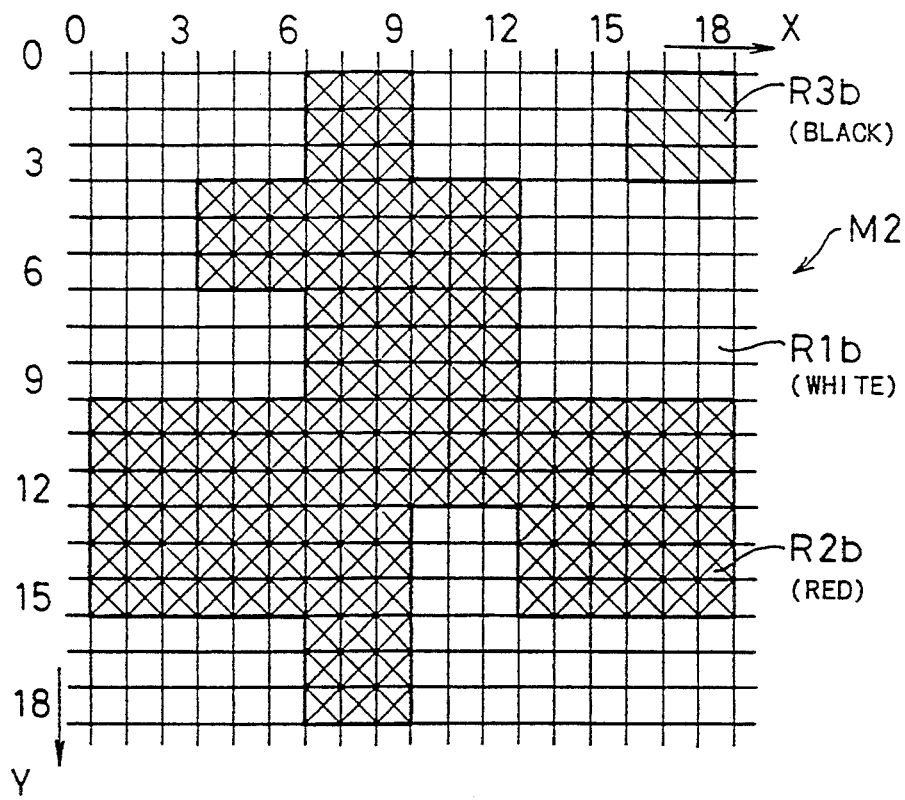
FIG. 10 is a plan view illustrating a high density image to be processed in the embodiment of FIG. 1.

The program then proceeds to step S9, at which the arithmetic and control unit 61 executes image magnification on the colored low density image of FIG. 8 with the magnification factor of N (in the embodiment, N is equal to 3), which is the reciprocal of the image reduction rate 1/N determined at step S4. In this image expansion, each pixel of the low density image is replaced by a pixel block of $N\times N$ pixels having the same color as the pixel in the low density image. FIG. 10 is a view showing a high density image M2 thus obtained.

Figure 11:
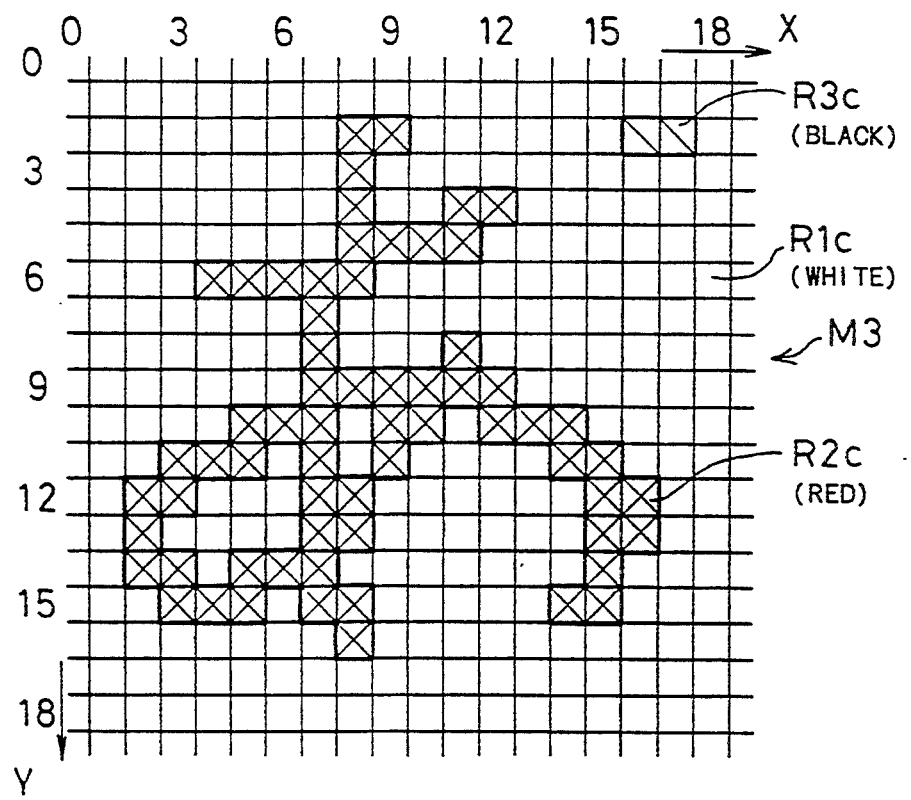
FIG. 11 is a plan view showing a regular image to be processed in the embodiment of FIG. 1.

At step S10, another image is composed from the original image M1 of FIG. 3 and the high density image M2 of FIG. 10. In the image composition, colors in the high density image M2 are maintained in the composed image only for the pixels which are included in the black image areas R2 and R3 in the original image M1, and colors for the other pixels are changed to white. In other words, the black image areas R2 and R3 are used as masks to pass colors in the high density image M2. FIG. 11 is a view showing the resultant image M3. Image data representing the image M3 is stored in the third image memory 33.

At the last step S11, the black pixels in the image M3 are changed to white ones; that is, the color of the image area R3c is changed to white. The colored image thus generated includes the character image area R2 painted with the desired color (red) and no pin holes because the pin hole image area R3 is eliminated.

As described above, the coloring process of the embodiment includes the step of specifying some subject image areas, and painting the subject image areas with a desired color while removing colors from the other image areas. Pin holes can be efficiently eliminated through the coloring process by not specifying pin holes as the subject image areas.

C. Procedure of Region Segmentation

Figure 12:
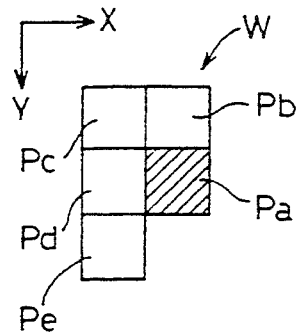
FIG. 12 is a view showing a process window used in region segmentation.

The region segmentation is performed in the following manner, for example. FIG. 12 is a view showing a window W used in the region segmentation process. The shaded pixel Pa is a pixel-to-be-processed, and peripheral pixels Pb through Pe are in contact with the pixel Pa.

The window W is successively moved in the main scanning direction Y in such an order that a scanning line at smaller subscanning coordinate X is scanned earlier. When only the pixel Pa is black and none of the other pixels Pb through Pe is black, a new system color number Ns is allocated to the pixel Pa. On the other hand, when the pixel Pa and any one of the peripheral pixels Pb through Pe are black, the system color number Ns allocated to the black peripheral pixel is given to the pixel Pa as its system color number Ns.

The pixel Pa in white is processed in a similar manner. That is, a new system color number Ns is allocated to the pixel Pa when all of the peripheral pixels are black, and the same system color number Ns is allocated to the pixel Pa as that of a white peripheral pixel when any one of the peripheral pixels is white. But when the subject pixel Pa and the pixels Pc and Pe each obliquely in contact with Pa are white, and the other pixels Pb and Pd are black, a different system color number Ns is allocated to the pixel Pa from that of the pixels Pc and Pe. This makes these white pixels only obliquely contacting each other to be separate regions. As a result, a black separate region and a white separate region which obliquely intersect each other are prevented.

While the window W is moved, different system color numbers Ns are successively allocated to independent regions. In such processing, there are some cases that two or more system color numbers Ns are allocated to one region. FIGS. 13 through 16 are explanatory views showing processes in such a case.

Figure 13:
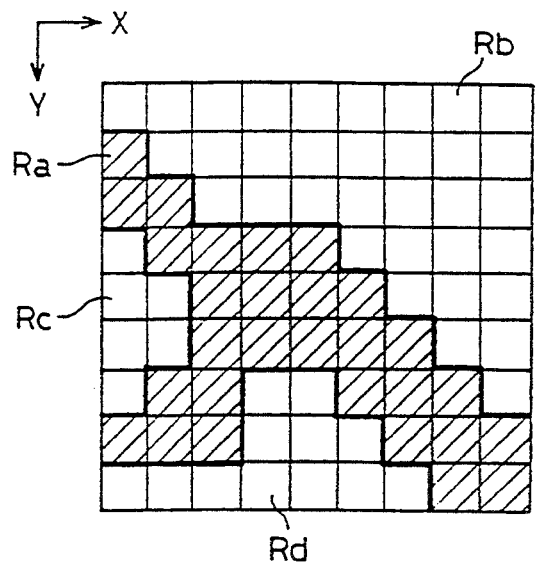

Suppose, as shown in FIG. 13, a block copy image includes a black region Ra and three independent white regions Rb, Rc, and Rd separated by the region Ra.

While the window W is successively moved in the main scanning direction Y in such an order that a scanning line at smaller subscanning coordinate X is scanned earlier, different system color numbers Ns are allocated to the respective regions Ra through Rd.

Figure 14:
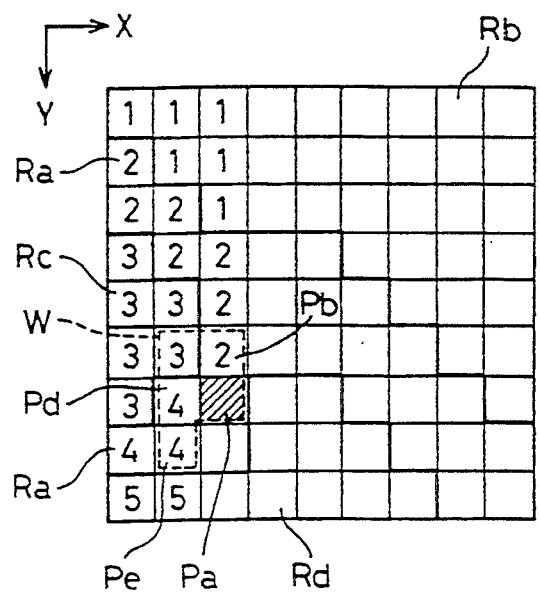

Numerals on pixels denote the system color numbers Ns allocated to the pixels in FIG. 14. Pixels without numerals do not have the system color numbers Ns yet. As seen in FIG. 14, the black region Ra includes pixels to which a numeral 2 is allocated as the system color number Ns and those with a numeral 4. When the window is on the position shown in FIG. 14, the system color number Ns on the pixel Pb in contact with the subject pixel Pa is equal to 2, and those on the peripheral pixels Pd and Pe are equal to 4. Information representing that Ns=2 and Ns=4 denote the same system color is temporarily stored in the auxiliary memory 62, and the smaller system color number Ns=2 is allocated to the subject pixel Pa. FIG. 15 shows a system color image or an image filled with respective system colors, and FIG. 17 shows an identical system color table IST, both obtained as a result of such processing for all the pixels of FIG. 13.

The table IST indicates that the system color numbers Ns=2 and Ns=4 denote an identical system color; that is, they are allocated to the same image region. The table IST also indicates that the numbers Ns=5 and Ns=6 also denote an identical system color. The table IST is stored in the auxiliary memory 62.

The arithmetic and control unit 61 then reallocates a common system color number (for example, the smallest system color number) to pixels with different system color numbers in the same image region for the image of FIG. 15 based on the table IST. The result of such processing is shown as an image of FIG. 16, in which each of the regions Ra through Rd has one system color number Ns which is different from those of the other regions.

Although processing of pixel image data is described above, run-length image data of FIG. 5 may be processed in the similar manner.

In processing of run-length image data, run-length data of two scanning lines adjacent to each other are read. The left peripheral pixels Pc, Pd, and Pe on the window W of FIG. 12 exist on the first scanning line closer to the origin of the coordinates, and the peripheral pixel Pb and the subject pixel Pa are on the second scanning line.

The run-length data for the two scanning lines are simultaneously examined. When the boundary of separate regions or separate run-lengths is located between the pixels Pc and Pd or Pd and Pe, the color of the subject pixel Pa is compared with those of the peripheral pixels Pb through Pe in the same manner as above. A system color number Ns is accordingly allocated to the subject pixel Pa. When the boundary of separate regions is located between the peripheral pixel Pb and the subject pixel Pa on the second scanning line, a system color number Ns is allocated to the subject pixel Pa in a similar manner.

Region segmentation is thus executed by allocating system color numbers Ns to the pixels in the image on the basis of run-length data while the run-length data on the two adjacent scanning lines are compared with each other.

The processing above divides the subject region PR into several separate areas and allocates a common system color number Ns to the pixels in each separate area. The system color numbers Ns are registered as system color data Dsc in each unit run-length data.

D. Modification

The invention is not limited to the above embodiment but there may be many modifications and changes without departing from the scope of the invention. Some examples of such modification are shown below.

(1) Process of step S11, that is, changing the color of the black areas to white, can be executed on the image of FIG. 8 or FIG. 10 instead of that of FIG. 11. In other words, the remaining black areas other than the subject image area can be changed to white any time after the subject image area is painted with the desired color. The color changing process from black to white on the low density image of FIG. 8 however has an advantage of decreasing the number of pixels to be processed.

The image composition at step S10 can be executed so as to maintain colors of the pixels which are in the black image areas R2 and R3 in the original image of FIG. 3 and which have the desired color (red) in the image M2 of FIG. 10 while colors of the other pixels are changed to white. This processing is executed by finding pixels having the display color number of '1' in the original image M1 and the display color number of '5' in the image M2, and by allocating the display color number '5' to these pixels while allocating the display color number '1' to the other pixels. Such processing attains both coloring of a subject image area and elimination of pin holes through one logic operation.

In general, a desirable color image is generated by allocating the desired color to pixels having the desired color in the high density image M2 and having the first base color (black) in the original image M1, and by allocating the second base color (white) to the other pixels.

(2) The coloring processing can be performed without the region segmentation executed at step S6. In this case, the arithmetic and control unit 61 identifies subject pixels for coloring (that is, pixels within the image area R2a in FIG. 6) in the coloring process of step S8. This identification is performed by finding one pixel having the desired color and crossing the segment S, and then finding all the pixels adjacent to or in contact with the first pixel. The desired color is then allocated to the subject pixels.

Figure 18:
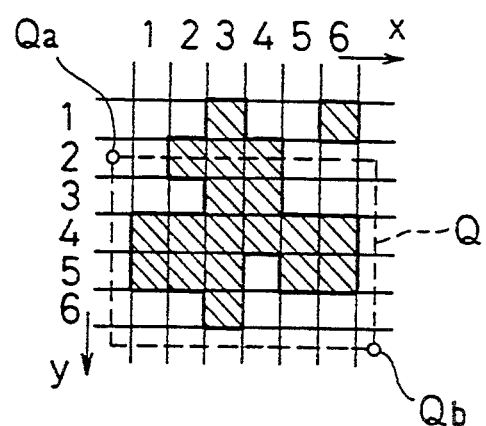
FIG. 18 is a plan view showing a region defining figure in a rectangular shape.

(3) A region defining figure with another geometrical shape can be used instead of the segment S for specifying the subject image area or the subject pixels for coloring. For example, a rectangle Q shown by the broken line in FIG. 18 can be used as the region defining figure. In this case, the operator inputs the positions of two vertexes Qa and Qb existing on a diagonal of the rectangle Q on the color monitor 53. The subject area for the coloring process is identified to be an image area which is painted with a specified color-to-be-processed (for example, black) and which exists at least partly inside the rectangle Q. Use of a two dimensional figure such as a rectangle allows a wide image area or a large number of image areas to be specified simultaneously specified as the target of the coloring process.

(4) Image reduction can be executed according to the method disclosed in PATENT APPLICATION LAYED-OPEN GAZETTE No. Sho-60-39977 and No. Sho-61-1174. Alternatively, the following special reduction process described below can be executed.

In the special reducing process, priority of colors is previously determined and the color of the highest priority among pixels in each pixel block is selected as a representative pixel.

Figure 19:
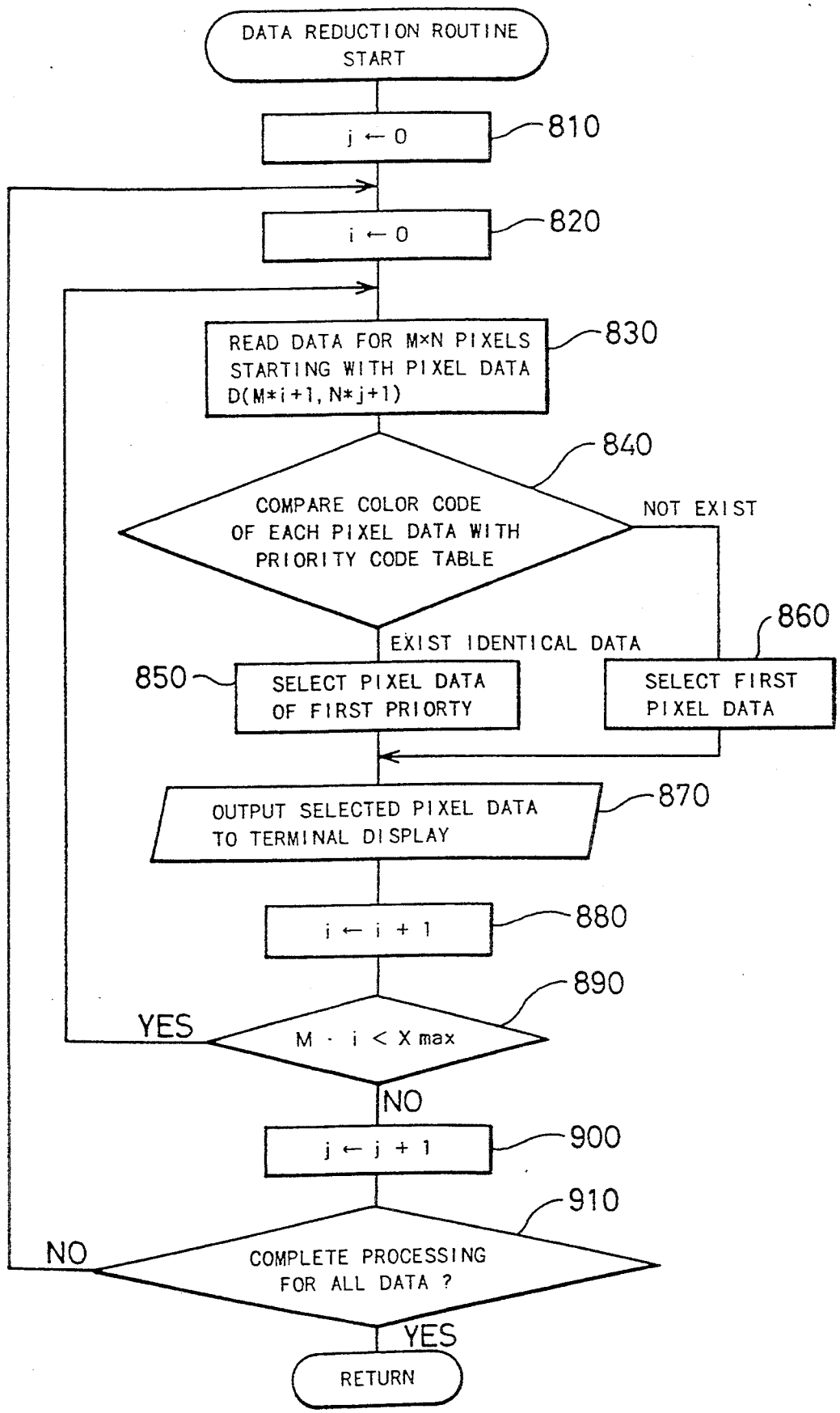
FIG. 19 is a flowchart showing process of specific density reduction.

FIG. 19 is a flowchart showing the details of the special reducing process. In such process, each $M \times N$ pixel block where M and N are integers is generally reduced to one pixel. In this embodiment, both M and N are equal to three.

When the program starts, variables j and i are cleared to zero at steps 810 and 820.

Image data for $M \times N$ pixels starting from image data $D(M*i+1, N*j+1)$ at coordinates $(M*i+1, N*j+1)$ are read at step 830, where the symbol * denotes multiplication. Since M and N are equal to 3, nine pixel data $D(1,1)$, $D(2,1)$, $D(3,1)$, $D(1,2)$, $D(2,2)$, $D(3,2)$, $D(1,3)$, $D(2,3)$, and $D(3,3)$ are read out in the initial conditions (i=0 and j=0). Pixel data for every nine pixels are successively read out at step 830 in the course of processing.

Figure 20:
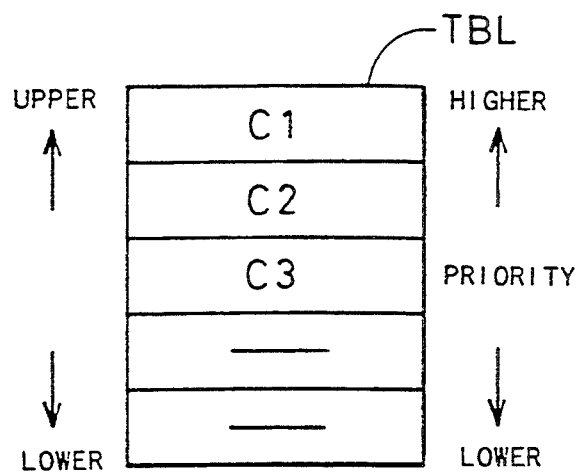
FIG. 20 is a view illustrating a priority code table.

At step 840, the color code or display color number of the pixel data D read at step 830 is compared with a priority code table TBL stored in the auxiliary memory 62. The priority of display colors is registered in the priority code table TBL as shown in FIG. 20. In the embodiment, the color corresponding to the display color number Nd(=1) specified at step S7 of FIG. 2, which is black, has the highest priority.

In black and white images, when priority of either of black or white is given in the priority code table TBL, priority of the other color may not be registered in the priority code table TBL.

When at least one color code of the nine pixel data D in the pixel block is found in the priority code table TBL, the program proceeds to step 850 at which the color code of the highest priority is selected out of color codes of the nine pixel data. On the other hand, when none of the color codes is found in the priority code table TBL at step 840, the program proceeds to step 860, at which the pixel data $D(M*i+1, N*j+1)$ at the left upper position in the pixel block is selected out of the pixel data D read out at step 830.

Figure 21:
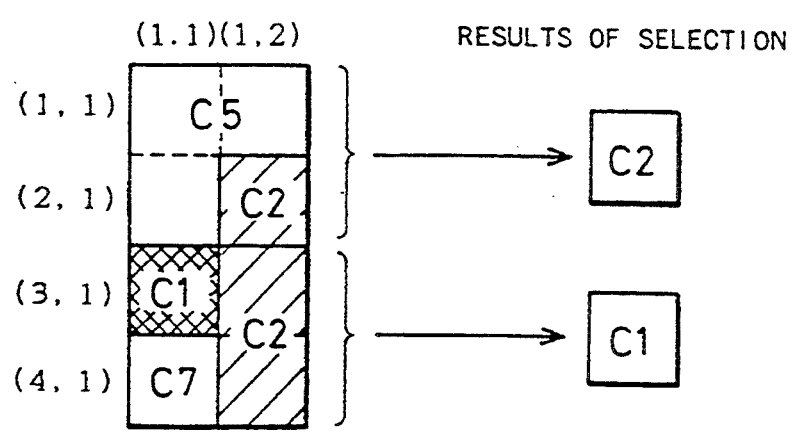
FIG. 21 is a view showing an example of a target image in the specific density reduction.

In an example of FIG. 21, pixel data D(2,2) representing the color C2 is selected among nine pixel data in the first pixel block PB1, and pixel data D(2,4) representing the color C1 is selected among nine pixel data in the second pixel block PB2.

The selected pixel data D is output as representative pixel data to the color monitor 53.

At step 880, the variable i is increased by one, and at step 890 the product of the variable i and a reduction ratio M in the main scanning direction is compared with a maximum value Xmax in the main scanning direction. If the answer is Yes, the program returns to step 830 and steps 830 through 890 are repeated.

By repeating processing of steps 830 through 890, pixel data of the highest priority is selected for each $M \times N$ pixel block, and output to the color monitor 53.

If the answer is No at step 890, the program proceeds to step 900 at which the variable j is increased by one. At step 910, it is judged whether processing is completed for the whole image data. If the answer is No, the program returns to step 820, and steps 820 through 910 are repeated. By such repeated processing, pixel data of the highest priority is transmitted to the color monitor 53 for each $M \times N$ pixel block. If the answer is Yes at step 910, the program exists from the routine.

In the special image reduction process, one color is selected for each pixel block according to the priority code table TBL, and a reduced image is filled with the selected color. The reduced image generated by the process clearly and accurately reproduces the original image without any line break or any missing parts.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for coloring an original image, which is painted with first and second colors and which includes a plurality of separate image areas each being painted with one color, by processing image data representing said original image, said apparatus comprising:

image reduction means for substituting a representative pixel for each of a selected plurality of blocks of M by N pixels in said original image, where M and N are integers, one of which is greater than one, to thereby produce a reduced image comprising representative pixels, each of said representative pixels having a color of one the M by N pixels in a corresponding block in said original image;

input means for selecting a target color from said first and second colors, selecting a target image area having said target color in said reduced image, and assigning a desired color to said target image area;

filling means for changing said target color of said target image area in said reduced image to said desired color to produce a reduced color image;

image magnification means for magnifying each pixel in said reduced color image to a corresponding block of M by N pixels, wherein all of said M by N pixels in said block are the same color as the corresponding pixel in said reduced color image, to produce a magnified color image; and color changing means for assigning a first color code representing said desired color to specific pixels in said magnified color image, said specific pixels comprising pixels of said magnified color image which are painted with said desired color and which, when said magnified image is superimposed as a mask on said original image, correspond to pixels in said original image which are painted with said target color, and assigning a second color code representing a non-target color to the other pixels in said magnified color image, said non-target color being one of said first and second colors other than said target color.

2. An apparatus in accordance with claim 1, wherein:

said first and second colors are represented by first and second color codes indicating black and white, respectively; and said step (a) also comprises assigning said target color to the representative pixel for a pixel block which has at least one pixel of said target color, and assigning said non-target color to the representative pixel for a pixel block which has no pixels of said target color.

3. An apparatus in accordance with claim 2, wherein:
said color changing means comprises means for assigning a desired color code to the pixels which have a target color code representing said target color in said original image and which have said desired color code in said magnified color image, said desired color code representing said desired color, and assigning a non-target color code indicating said non-target color to the other pixels in said magnified color image.

4. An apparatus in accordance with claim 3, wherein:
said input means comprises means for specifying a straight line segment in said reduced image; and
wherein said apparatus further comprises means for identifying said target image area which has said target color and on which said line segment is crossing.

5. An apparatus in accordance with claim 3, wherein:
said input means comprises means for specifying a plane figure in said reduced image; and
wherein said apparatus further comprises means for identifying said target image area which has said target color and at least part of which is included in said plane figure.

6. An apparatus for coloring an original image, which is painted with first and second colors and which includes a plurality of separate image areas each being painted with one color, by processing original image data representing said original image, said apparatus comprising:
a first memory for storing said original image data;
means for producing a reduced image representative of said original image;
display means for displaying images;
input means for selecting a target color from said first and second colors, selecting a target image area having said target color in said reduced image, and assigning a desired color to said target image area;
computation means for substituting a representative pixel for each of a selected plurality of blocks of M by N pixels in said original image, where M and N are integers, at least one of which is greater than one, to produce a reduced image comprising representative pixels; changing said target color of said target image area to said desired color to produce a reduced color image; magnifying each representative pixel in said reduced color image to a corresponding block of M by N pixels, wherein all of said M by N pixels in said reduced block are the same color as the corresponding pixel in said reduced color image to produce a magnified color image; assigning a first color code representing said desired color to specific pixels in said magnified color image, said specific pixels comprising pixels of said magnified color image which are painted with said desired color and which, when said magnified image is superimposed as a mask on said original image, correspond to pixels in said original image which are painted with said target color, and assigning a second color code representing a non-target color to the other pixels in said magnified color image, said non-target color being one of said first and second colors other than said target color, to thereby produce modified color image data representing a modified color image; and
a second image memory for storing said modified color image data.

7. An apparatus in accordance with claim 6, further comprises:
means for capturing said original image data in the form of run-length data;
means for converting run-length data to bit map data; and wherein:
said computation means comprises means for producing said modified color image data in the form of run-length data.

8. An apparatus in accordance with claim 7, further comprising:
means for recording said modified color image data on a photosensitive recording medium; and wherein
said means for capturing said original image data comprises means for reading said original image to produce original bit map data, and converting said original bit map data into run-length data.

* * * * *